(12) United States Patent
Sasakuma et al.

(10) Patent No.: US 9,752,018 B2
(45) Date of Patent: Sep. 5, 2017

(54) RUBBER COMPOSITION FOR CONVEYOR BELT, AND CONVEYOR BELT

(71) Applicant: The Yokohama Rubber Co., LTD., Minato-ku, Tokyo (JP)

(72) Inventors: Hidehiro Sasakuma, Hiratsuka (JP); Ryota Takahashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/311,070

(22) PCT Filed: May 13, 2015

(86) PCT No.: PCT/JP2015/063790
§ 371 (c)(1),
(2) Date: Nov. 14, 2016

(87) PCT Pub. No.: WO2015/174461
PCT Pub. Date: Nov. 19, 2015

(65) Prior Publication Data
US 2017/0107363 A1    Apr. 20, 2017

(30) Foreign Application Priority Data
May 14, 2014 (JP) ................................. 2014-100451

(51) Int. Cl.
*B65G 15/34* (2006.01)
*C08L 15/00* (2006.01)
(Continued)

(52) U.S. Cl.
CPC .............. *C08L 15/00* (2013.01); *B65G 15/32* (2013.01); *C08L 7/00* (2013.01)

(58) Field of Classification Search
CPC ........... B65G 15/32; B65G 15/34; C08L 9/00; C08L 7/00; C08L 15/00; C08K 3/04; C08K 3/36; C08K 5/06; C08K 5/54
See application file for complete search history.

(56) References Cited

U.S. PATENT DOCUMENTS 6,099,972 A * 8/2000 Klumb .................... B65G 15/32
427/207.1
9,624,372 B2 * 4/2017 Yoshida .................. C08L 75/06
(Continued)

FOREIGN PATENT DOCUMENTS

JP    2007-224075    9/2007
JP    2008-038133    2/2008
(Continued)

OTHER PUBLICATIONS

International Search Report for International Application No. PCT/JP2015/063790 dated Jul. 28, 2015, 4 pages, Japan.

*Primary Examiner* — James R Bidwell
(74) *Attorney, Agent, or Firm* — Thorpe North & Western (57) ABSTRACT

A rubber composition of the present technology for a conveyor belt contains a diene rubber and a carbon black, the diene rubber containing: a natural rubber; and a modified butadiene rubber obtained by modifying a butadiene rubber with a nitrone compound; the content of the natural rubber in the diene rubber being 30 to 85 mass %, and the content of the modified butadiene rubber in the diene rubber being 15 to 70 mass %.

20 Claims, 1 Drawing Sheet

(51) Int. Cl.
*B65G 15/32* (2006.01)
*C08L 7/00* (2006.01)

(56) References Cited

U.S. PATENT DOCUMENTS

| | | | |
|---|---|---|---|
| 2012/0168285 A1* | 7/2012 | Holland | B65G 15/34 |
| | | | 198/847 |
| 2013/0131279 A1 | 5/2013 | Araujo Da Silva et al. | |
| 2014/0353129 A1* | 12/2014 | Nakano | B65G 15/32 |
| | | | 198/844.1 |
| 2015/0001047 A1* | 1/2015 | Nakano | B65G 15/32 |
| | | | 198/844.1 |
| 2015/0217940 A1* | 8/2015 | Si | B65G 15/36 |
| | | | 198/847 |
| 2015/0368450 A1* | 12/2015 | Sato | C08L 23/16 |
| | | | 198/846 |
| 2016/0122519 A1* | 5/2016 | Nakano | B65G 15/32 |
| | | | 524/189 |
| 2017/0029598 A1* | 2/2017 | Ishikawa | B65G 15/32 |

FOREIGN PATENT DOCUMENTS

| | | |
|---|---|---|
| JP | 2008-208163 | 9/2008 |
| JP | 2013-530299 | 7/2013 |
| JP | 2013-241550 | 12/2013 |
| WO | WO 2008/007733 | 1/2008 |
| WO | WO 2010/143633 | 12/2010 |
| WO | WO 2012/007441 | 1/2012 |

\* cited by examiner

FIG. 1

RUBBER COMPOSITION FOR CONVEYOR BELT, AND CONVEYOR BELT

TECHNICAL FIELD

The present technology relates to a rubber composition for a conveyor belt and a conveyor belt.

BACKGROUND ART

A conveyor belt is used for transportation of materials and the like, and as the transportation volume increases, demands in improvement in durability (tear resistance, bending resistance and the like) have increased in recent years.

Meanwhile, in order to improve transportation efficiency, a conveyor belt as long as several kilometers in length is also introduced in the market. Accordingly, the power consumption is also increasing. Therefore, a conveyor system with good energy-saving properties is also in demand. Furthermore, there is an increase in demand for a conveyor belt in cold regions. Thus, good energy-saving properties are also required at low temperatures, such as approximately −40° C. That is, good energy-saving properties are required for a wide range of temperatures (for example, −40 to 20° C.).

As a rubber composition used for production of a conveyor belt, Japanese Unexamined Patent Application Publication No. 2008-38133A discloses "a rubber composition for a conveyor belt comprising a rubber component including a natural rubber (NR) and a poly-butadiene rubber (BR), a carbon black and the like". In addition, Japanese Unexamined Patent Application Publication No. 2008-38133A discloses that energy consumption can be reduced by using such a rubber composition for a conveyor belt.

Under these circumstances, the present inventors have studied a rubber composition for a conveyor belt containing a natural rubber, a butadiene rubber and a carbon black using Japanese Unexamined Patent Application Publication No. 2008-38133A as a reference. The study lead the present inventors to realize that energy-saving properties, tear resistance, and bending resistance of the conveyor belt obtained requires further improvement considering the increased level of demand for the future transportation efficiency and durability.

SUMMARY

The present technology provides: a rubber composition for a conveyor belt, the rubber composition exhibiting exceptional energy-saving properties, tear resistance, and bending resistance when made into a conveyor belt; and a conveyor belt in which such a rubber composition for conveyor belt is used.

As a result of diligent research, the present inventors discovered that energy-saving properties, tear resistance, and bending resistance of the conveyor belt can be improved by blending a modified butadiene rubber, which can be obtained by modifying a butadiene rubber with a nitrone compound, at a predetermined ratio.

Specifically, the inventors discovered that the improvements to energy-saving properties, tear resistance, and bending resistance of the conveyor belt can be achieved by the following features.

(1) A rubber composition for a conveyor belt containing: a diene rubber and a carbon black, the diene rubber containing:
a natural rubber; and
a modified butadiene rubber obtained by modifying a butadiene rubber with a nitrone compound;
the content of the natural rubber in the diene rubber being 30 to 85 mass %, and the content of the modified butadiene rubber in the diene rubber being 15 to 70 mass %.

(2) The rubber composition for a conveyor belt according to (1) described above, wherein the nitrone compound contains a carboxy group.

(3) The rubber composition for a conveyor belt according to (1) or (2) described above, wherein the content of the carbon black is from 20 to 50 parts by mass per 100 parts by mass of the diene rubber.

(4) The rubber composition for a conveyor belt according to any one of (1) to (3) described above, wherein a nitrogen adsorption specific surface area of the carbon black is from 25 to 100 $m^2/g$.

(5) The rubber composition for a conveyor belt according to any one of (1) to (4) described above, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(6) The rubber composition for a conveyor belt according to any one of (1) to (5) described above, wherein a degree of modification of the modified butadiene rubber is from 0.02 to 4.0 mol %, where "degree of modification" refers to the proportion (mol %) of double bonds modified with the nitrone compound to all the double bonds contained in the butadiene rubber.

(7) A conveyor belt comprising the rubber composition for a conveyor belt described in any one of (1) to (6) described above as a lower cover rubber layer.

As described below, according to the present technology, a rubber composition for a conveyor belt and a conveyor belt can be provided, where the rubber composition for a conveyor belt is the rubber composition exhibiting exceptional energy-saving properties, tear resistance, and bending resistance when made into a conveyor belt; and the conveyor belt is a conveyor belt in which such a rubber composition for conveyor belt is used.

DETAILED DESCRIPTION

Hereinafter, a rubber composition for a conveyor belt and a conveyor belt comprising the rubber composition for a conveyor belt of the present technology will be described.

In this specification, a numerical range represented using "(from) . . . to . . . " refers to a range including the numerical values stated before and after the " . . . to . . . " as a lower limit value and an upper limit value.

Rubber Composition for a Conveyor Belt

The rubber composition of the present technology for a conveyor belt (referred to as a composition of the present technology hereinafter as well) contains a diene rubber and a carbon black, the diene rubber containing: a natural rubber; and a modified butadiene rubber obtained by modifying a butadiene rubber with a nitrone compound; the content of the natural rubber in the diene rubber being 30 to 85 mass %, and the content of the modified butadiene rubber in the diene rubber being 15 to 70 mass %.

It is conceived that, since the composition of the present technology has such a constitution, the composition exhibits excellent energy-saving properties, tear resistance and bending resistance when formed into a conveyor belt. Although the reason is not clear, it is assumed to be as follows.

As described above, the composition of the present technology contains a modified butadiene rubber obtained by modifying a butadiene rubber with a nitrone compound. In such a composition, the nitrone-modified portion in the modified butadiene rubber interacts (bonds) with a carbon black in the composition. Thus, energy loss due to friction between the rubber and the carbon black during bending can be suppressed. Supposedly, energy-saving properties of the conveyor belt made from the composition are excellent as a result.

Additionally, because the nitrone-modified portion in the modified butadiene rubber interacts with a carbon black in the composition as described above, dispersion of the carbon black is improved, resulting in an improved uniformity of the belt conveyor obtained. Supposedly, tear resistance and bending resistance are improved as a result.

Each component contained in the composition of the present technology will be described in detail hereinafter.

Diene Rubber

A diene rubber used in the composition of the present technology contains a natural rubber and a modified butadiene rubber obtained by modifying a butadiene rubber with a nitrone compound. The content of the natural rubber in the diene rubber is 30 to 85 mass % and the content of the modified butadiene rubber in the diene rubber is 15 to 70 mass %.

The diene rubber may contain a rubber component other than a natural rubber and the modified butadiene rubber. Such a rubber component is not particularly limited, but examples include an isoprene rubber (IR), a butadiene rubber (BR), an aromatic vinyl-conjugated diene copolymer rubber (e.g. styrene-butadiene rubber (SBR)), an acrylonitrile-butadiene copolymer rubber (NBR), a butyl rubber (IIR), a halogenated butyl rubber (Br-IIR, Cl-IIR), and a chloroprene rubber (CR). Of these, a butadiene rubber (BR) is preferable.

Natural Rubber

The diene rubber contained in the composition of the present technology includes a natural rubber.

The content of the natural rubber in the diene rubber is 30 to 85 mass %. If the content of the natural rubber is out of the range above, the energy-saving properties or tear resistance and bending resistance are insufficient.

Nitrone-Modified Butadiene Rubber

As described above, a diene rubber used in the composition of the present technology contains a modified butadiene rubber obtained by modifying a butadiene rubber with a nitrone compound (referred to as a nitrone-modified butadiene rubber hereinafter in some cases).

Butadiene Rubber

A butadiene rubber used for production of a nitrone-modified butadiene rubber is not particularly limited.

A butadiene monomer used for production of the butadiene rubber is not particularly limited and the examples include 1,3-butadiene, and 2-chloro-1,3-butadiene. Among these, 1,3-butadiene is preferably used. A single butadiene monomer may be used alone, or a combination of two or more butadiene monomers may be used.

From the viewpoint of handling, the butadiene rubber described above preferably has a weight average molecular weight (Mw) of from 100,000 to 1,500,000, and more preferably from 300,000 to 1,300,000. In the present disclosure, the weight average molecular weight (Mw) is measured by gel permeation chromatography (GPC) using tetrahydrofuran as a solvent, and calibrated using standard polystyrene.

Nitrone Compound

A nitrone compound used for production of a nitrone-modified butadiene rubber is not particularly limited, as long as it is a compound having a nitrone group represented by Formula (1) below.

Formula (1)

In Formula (1), * indicates a bond position.

The nitrone compound is preferably a compound represented by Formula (2) below.

Formula (2)

In Formula (2) above, X and Y each independently represent an aliphatic hydrocarbon group, an aromatic hydrocarbon groups or an aromatic heterocyclic group, optionally having a substituent.

Examples of the aliphatic hydrocarbon group represented by X or Y include alkyl groups, cycloalkyl groups, and alkenyl groups. Examples of the alkyl group include a methyl group, an ethyl group, a n-propyl group, an isopropyl group, a n-butyl group, an isobutyl group, a sec-butyl group, a tert-butyl group, a n-pentyl group, an isopentyl group, a neopentyl group, a tert-pentyl group, an 1-methylbutyl group, a 2-methylbutyl group, an 1,2-dimethylpropyl group, a n-hexyl group, a n-heptyl group, and a n-octyl group. Among these, alkyl groups having from 1 to 18 carbons are preferable, and alkyl groups having from 1 to 6 carbons are more preferable. Examples of the cycloalkyl group include a cyclopropyl group, a cyclobutyl group, a cyclopentyl group, and a cyclohexyl group. Among these, cycloalkyl groups having from 3 to 10 carbons are preferable, and cycloalkyl groups having from 3 to 6 carbons are more preferable. Examples of the alkenyl group include a vinyl group, an 1-propenyl group, an allyl group, an isopropenyl group, an 1-butenyl group, and a 2-butenyl group. Among these, alkenyl groups having from 2 to 18 carbons are preferable, and alkenyl groups having from 2 to 6 carbons are more preferable.

Examples of the aromatic hydrocarbon group represented by X or Y include aryl groups, and aralkyl groups.

Examples of the aryl group include a phenyl group, a naphthyl group, an anthryl group, a phenanthryl group, and a biphenyl group. Among these, aryl groups having from 6 to 14 carbons are preferable, aryl groups having from 6 to 10 carbons are more preferable, and a phenyl group and a naphthyl group are even more preferable.

Examples of the aralkyl group include a benzyl group, a phenethyl group, and a phenylpropyl group. Among these, aralkyl groups having from 7 to 13 carbons are preferable, aralkyl groups having from 7 to 11 carbons are more preferable, and a benzyl group is even more preferable.

Examples of the aromatic heterocyclic group represented by X or Y include a pyrrolyl group, a furyl group, a thienyl group, a pyrazolyl group, an imidazolyl group (an imidazole group), an oxazolyl group, an isooxazolyl group, a thiazolyl group, an isothiazolyl group, a pyridyl group (a pyridine group), a furan group, a thiophene group, a pyridazinyl group, a pyrimidinyl group, and a pyrazinyl group. Among these, pyridyl groups are preferable.

The substituents that may be included in the group represented by X or Y is not particularly limited and examples thereof include an alkyl group having from 1 to 4 carbons, a hydroxy group, an amino group, a nitro group, a carboxy group, a sulfonyl group, an alkoxy group, and a halogen atom. Among these, carboxy groups are preferable.

Note that examples of the aromatic hydrocarbon group having such a substituent include aryl groups having a substituent, such as a tolyl group and a xylyl group; and aralkyl groups having a substituent, such as a methylbenzyl group, an ethylbenzyl group, and a methylphenethyl group.

The compound represented by Formula (2) above is preferably a compound represented by Formula (3) below.

Formula (3)

In Formula (3), m and n each independently represent an integer from 0 to 5, and a sum of m and n is 1 or greater.

The integer represented by m is preferably an integer from 0 to 2, and more preferably an integer 0 or 1, because solubility to a solvent during nitrone compound synthesis is better and thus synthesis easier.

The integer represented by n is preferably an integer from 0 to 2, and more preferably an integer 0 or 1, because solubility to a solvent during nitrone compound synthesis is better and thus synthesis easier.

Furthermore, the sum of m and n (m+n) is preferably from 1 to 4, and more preferably 1 or 2.

Carboxynitrone represented by Formula (3) is not particularly limited, but is preferably a compound selected from the group consisting of N-phenyl-α-(4-carboxyphenyl)nitrone represented by Formula (3-1) below, N-phenyl-α-(3-carboxyphenyl)nitrone represented by Formula (3-2) below, N-phenyl-α-(2-carboxyphenyl)nitrone represented by Formula (3-3) below, N-(4-carboxyphenyl)-α-phenylnitrone represented by Formula (3-4) below, N-(3-carboxyphenyl)-α-phenylnitrone represented by Formula (3-5) below, and N-(2-carboxyphenyl)-α-phenylnitrone represented by Formula (3-6) below.

(3-1)

-continued

(3-2)

(3-3)

(3-4)

(3-5)

(3-6)

The method of synthesizing the nitrone compound is not particularly limited, and conventionally known methods can be used. For example, a nitrone compound having a nitrone group may be obtained by stirring a compound having a hydroxyamino group (—NHOH) and a compound having an aldehyde group (—CHO) at a molar ratio of hydroxyamino group to aldehyde group (—NHOH/—CHO) of 1.0 to 1.5 in the presence of an organic solvent (for example methanol, ethanol, and tetrahydrofuran) at room temperature for 1 to 24 hours to allow the both groups to react.

Method of Preparing Nitrone-Modified Butadiene Rubber

The method for modifying a butadiene rubber with a nitrone compound is not particularly limited. Examples of the method include blending the butadiene rubber described above and the nitrone compound at a temperature of 100° C. to 200° C. for 1 to 30 minutes.

When blended as such, a cycloaddition reaction occurs between the double bond of the butadiene rubber and the nitrone group in the nitrone compound, forming a five-membered ring as illustrated in Formulas (4) and (5) below. Note that Formula (4) below represents a reaction between a double bond of a butadiene rubber with 1,4 bond and a nitrone compound, and Formula (5) below represents a reaction between a double bond of a butadiene rubber with 1,2 bond and a nitrone compound. Formulas (4) and (5) illustrate the reactions for the case where the butadiene is 1,3-butadiene, but the reactions for the case where the butadiene is a butadiene other than 1,3-butadiene also gives a five membered ring via a similar reaction.

Formula (4)

Formula (5)

Here, the amount of the nitrone compound that reacts with the butadiene rubber is not particularly limited, but preferably from 0.1 to 10 parts by mass and more preferably from 0.3 to 5 parts by mass, per 100 parts by mass of the butadiene rubber.

Degree of Modification

The degree of modification of the nitrone-modified butadiene rubber is not particularly limited, but is preferably from 0.02 to 4.0 mol %, and more preferably from 0.04 to 3.0 mol %.

Here, "degree of modification" refers to the proportion (mol %) of the double bonds modified with a nitrone compound to all the double bonds contained in the butadiene rubber. For example, if the butadiene is 1,3-butadiene, a degree of modification is the proportion of formation of the structure represented by Formula (4) or (5) above, via the modification with a nitrone compound. The degree of modification, for example, can be determined by NMR measurement of the butadiene rubber above and the nitrone-modified butadiene rubber (i.e., the butadiene rubber before and after modification).

It should be noted that a nitrone-modified butadiene with 100 mol % of a degree of modification is also classified as a diene rubber in the present disclosure.

As stated above, the content of the nitrone-modified butadiene rubber in the diene rubber is 15 to 70 mass %. In particular, the content of the nitrone-modified butadiene rubber is preferably 40 mass % or greater.

If the content of the nitrone-modified butadiene rubber in the diene rubber is out of the 15 to 70 mass % range, the energy-saving properties or tear resistance and bending resistance are insufficient.

Carbon Black

The carbon black contained in the composition of the present technology is not particularly limited and, for example, carbon blacks with various grades, such as SAF-HS, SAF, ISAF-HS, ISAF, ISAF-LS, IISAF-HS, HAF-HS, HAF, HAF-LS, FEF, GPF, or SRF can be used. Among these, HAF or GPF is preferable.

The nitrogen adsorption specific surface area ($N_2SA$) of the carbon black is not particularly limited, but is preferably from 25 to 100 $m^2/g$.

Note that the nitrogen adsorption specific surface area ($N_2SA$) is a value of the amount of nitrogen adsorbed to the surface of carbon black, measured in accordance with JIS (Japanese Industrial Standard) K6217-2:2001 (Part 2: Determination of specific surface area—Nitrogen adsorption methods—Single-point procedures).

The content of the carbon black in the composition of the present technology is not particularly limited, but is preferably from 20 to 50 parts by mass, per 100 parts by mass of the diene rubber described above.

Other Components: Optional Components

The composition of the present technology may include other components such as silica, a silane coupling agent, a vulcanization agent, a vulcanization aid, or a vulcanization retarder and, furthermore, may include various compounding agents as long as they will not impair the objective of the present technology.

Silica

The silica is not particularly limited and examples thereof include a fumed silica, a calcined silica, a precipitated silica, a pulverized silica, a molten silica, a silica anhydride fine particle, a hydrated silicic acid fine particle, hydrated aluminum silicate, and a hydrated calcium silicate. One type of these materials can be used alone or two or more types can be used in combination.

Silane Coupling Agent

The silane coupling agent is not particularly limited, but is preferably a polysulfide-based silane coupling agent used for rubbers.

Among the polysulfide-based silane coupling agents, specific examples include bis(3-triethoxysilylpropyl)tetrasulfide and bis(3-(triethoxysilyl)propyl) disulfide are preferable.

Vulcanization Agent

The vulcanization agent is not particularly limited, and examples include sulfur, organic peroxide-based, metal oxide-based, phenolic resin, and quinone dioxime.

Examples of sulfur include powdered sulfur, precipitated sulfur, highly dispersible sulfur, surface treated sulfur, insoluble sulfur, dimorpholine disulfide, and alkylphenol disulfide.

Examples of organic peroxide vulcanization agents include benzoyl peroxide, t-butyl hydroperoxide, 2,4-dichlorobenzoyl peroxide, 2,5-dimethyl-2,5-di(t-butylperoxy) hexane, and 2,5-dimethylhexane-2,5-di(peroxyl benzoate).

Examples of other vulcanization agents include magnesium oxide, litharge, p-quinone dioxime, p-dibenzoylquinone dioxime, poly-p-dinitrosobenzene, and methylenedianiline.

Vulcanization Aid

As a vulcanization aid, a conventional aid for a rubber can be used in combination. For example, zinc oxide, stearic acid, oleic acid and their Zn salts or the like can be used.

Vulcanization Retarder

Specific examples of the vulcanization retarder include organic acids such as phthalic anhydride, benzoic acid, salicylic acid, and acetylsalicylic acid; nitroso compounds such as N-nitroso-diphenylamine, N-nitroso-phenyl-β-naphthylamine, and N-nitroso-trimethyl-dihydroquinoline polymer; halides such as trichloromelanine; 2-mercaptobenzimidazole, and Santogard PVI.

Examples of the compounding agents include fillers other than the carbon black, antiaging agents, antioxidants, pigments (dyes), plasticizers, thixotropic agents, UV absorbents, flame retardants, solvents, surfactants (including leveling agents), dispersants, dehydrating agents, anticorrosive agents, adhesion promoters, antistatic agents, and processing aid.

For these compounding agents, agents generally used for a rubber composition may be used. The compounding amounts of such compounding agents are not particularly limited and can be selected as appropriate.

Method for Producing the Rubber Composition for a Conveyor Belt

The method for producing the composition of the present technology is not particularly limited, and specific examples thereof include a method whereby each of the above-mentioned components is kneaded using a publicly known method and device (e.g. Banbury mixer, kneader, and roll). If the composition of the present technology contains sulfur or a vulcanization accelerator, the components other than the sulfur and the vulcanization accelerator are preferably blended first at high temperatures (for example, 40° C. to 160° C.), then cooled, before the sulfur and the vulcanization accelerator are blended.

In addition, the composition of the present technology can be vulcanized or crosslinked under conventional, publicly known vulcanizing or crosslinking conditions.

Conveyor Belt

The conveyor belt of the present technology is a conveyor belt in which the composition of the present technology is used.

Preferable embodiments of the conveyor belt of the present technology include, for example, a conveyor belt which includes an upper cover rubber layer, a reinforcing layer and a lower cover rubber layer, and the composition of the present technology is used at least in the lower cover rubber layer.

The preferable embodiment of the conveyor belt of the present technology will be described below using FIG. 1.

Figure 1:
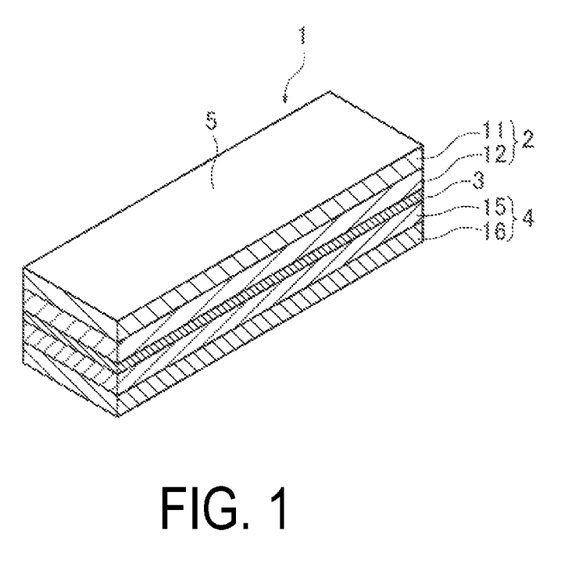
FIG. 1 is a cross-sectional view schematically illustrating a preferred embodiment of the conveyor belt of the present technology.

FIG. 1 is a cross-sectional view of a conveyor belt illustrating an example of the preferable embodiment of the present technology. In FIG. 1, the constituting parts are: conveyor belt 1; upper cover rubber layer 2; reinforcing layer 3; lower cover rubber layer 4; conveying face for transporting articles 5; outer layers 11 and 16; and inner layers 12 and 15.

As illustrated in FIG. 1, the reinforcing layer 3 is a center layer in the conveyor belt 1, and the upper cover rubber layer 2 and the lower cover rubber layer 4 are disposed on each side of the reinforcing layer 3. The upper cover rubber layer 2 is configured with two layers, the outer layer 11 and the inner layer 12. The lower cover rubber layer 4 is configured with two layers, the outer layer 16 and the inner layer 15. The outer layers and the inner layers in the upper cover rubber layer 2 and the lower cover rubber layer 4 (the outer layer 11 and the inner layer 12, the outer layer 16 and the inner layer 15, respectively) may be independently formed from different rubber compositions.

In FIG. 1, the upper cover rubber layer 2 is configured with two layers, the outer layer 11 and the inner layer 12. However, the number of the layers that configure the upper cover rubber layer 2 is not limited to two; it may be one or three or greater. Also, if the number of the layers that configure the upper cover rubber layer is three or greater, these layers may be independently formed from different rubber compositions. The same description applies to the lower cover rubber layer 4.

The outer layer 11 that configures the conveying face for transporting articles 5 of the upper cover rubber layer 2 is preferably formed from a rubber composition that has superior heat resistance, wear resistance, oil resistance and the like. In addition, the inner layer 12 of the upper cover rubber layer 2 contributes to adhesion between the reinforcing layer 3 and the outer layer 11. Therefore, the upper cover rubber layer 2 is preferably configured with two layers of the outer layer and the inner layer.

The outer layer 16 that configures the back surface of the lower cover rubber layer 4 is formed from the composition of the present technology described above. The inner layer 15 of the lower cover rubber layer 4 is preferably formed from a rubber composition other than the composition of the present technology, because of emphasis on production cost and adhesion to the reinforcing layer 3. Therefore, the lower cover rubber layer 4 is preferably configured with two layers.

A core body of the reinforcing layer 3 is not particularly limited and a material generally used for a conveyor belt can be selected for use as appropriate. Specific examples thereof include: a material made of a cotton cloth and a chemical fiber or a synthetic fiber, coated and permeated with a rubber paste; a material enfolded with a cotton cloth and a chemical fiber or a synthetic fiber, subjected to RFL treatment; a special weave nylon canvas, and steel cords. One type of these can be used alone or two or more types can be laminated for use.

The shape of the reinforcing layer 3 is not particularly limited. The reinforcing layer 3 can be a sheet-shape as illustrated in FIG. 1, or wire-shaped reinforcing strips arranged in parallel.

A rubber composition that forms the inner layer 12 of the upper cover rubber layer 2 and the inner layer 15 of the lower cover rubber layer 4 is not particularly limited and a rubber composition generally used for a conveyor belt may be selected for use as appropriate. One type of rubber compositions may be used alone or two or more types may be used as a blend.

A rubber composition that forms the outer layer 11 of the upper cover rubber layer 2 is not particularly limited and a rubber composition generally used for a conveyor belt may be selected for use according to basic characteristics required for the outer layer (such as heat resistance, wear resistance, and oil resistance, for example) as appropriate.

A thickness of the lower cover rubber layer 4 is preferably 3 to 20 mm and more preferably 5 to 15 mm. The thickness of the lower cover rubber layer 4 herein is a total of the thickness of inner layer 15 and the thickness of the outer layer 16, if the lower cover rubber layer 4 is configured with these layers.

If the thickness of the lower cover rubber layer 4 is within this range, cupping of the belt induced by the degradation of rubber and the like can be prevented even when the conveyor belt is used for transportation of transportation articles at high temperatures.

Examples

Hereinafter, the present technology will be further described in detail with reference to examples; however, the present technology is not limited thereto.

Synthesis of Nitrone Compound

In a 2 L eggplant-shaped flask, methanol heated to 40° C. (900 mL) was loaded, and then terephthalaldehydic acid represented by Formula (b-1) below (30.0 g) was added and dissolved. To this solution, a solution, in which phenylhydroxylamine represented by Formula (a-1) below (21.8 g) was dissolved in methanol (100 mL), was added and stirred at room temperature for 19 hours. After the completion of stirring, carboxynitrone (41.7 g) represented by Formula (c-1) below was obtained by recrystallization from methanol. The yield was 86%.

Synthesis of Nitrone-Modified Butadiene Rubber

The butadiene rubber (NIPOL BR1220, manufactured by Nihon Zeon Corp.) was introduced in a Banbury mixer at 120° C. and kneaded raw for two minutes. Then, one part by mass of the nitrone compound synthesized as described above was introduced into 100 parts by mass of the butadiene rubber and the mixture was blended for 5 minutes at 160° C. Thus, the butadiene rubber was modified with the nitrone compound. Thus, the nitrone-modified butadiene rubber was obtained.

The obtained nitrone-modified butadiene rubber was measured by NMR and the degree of modification of the nitrone-modified butadiene rubber was found to be 0.1 mol %. Specifically, the degree of modification was determined as described below. Namely, the butadiene rubbers before and after modification were measured for the peak area at around 8.08 ppm (assigned to two protons adjacent to the carboxy group) via $^1$H-NMR (CDCl$_3$, 400 MHz, TMS) using CDCl$_3$ as a solvent to find the degree of modification. Note that the samples used in the $^1$H-NMR measurement of the nitrone-modified butadiene rubber were dissolved in toluene, purified by methanol precipitation 2 times, and then dried under reduced pressure.

Preparation of Rubber Composition for Conveyor Belt

The components shown in Table 1 below were blended in the proportions (parts by mass) shown in Table 1.

Specifically, the components shown in Table 1 below except from sulfur and the vulcanization accelerator were first mixed in a Banbury mixer for 5 minutes at 60° C. Thereafter, a roll was used to mix in the sulfur and the vulcanization accelerator to obtain each rubber composition for a conveyor belt (also referred to as "rubber composition" hereinafter).

Evaluation of Energy-Saving Properties

The obtained rubber composition was vulcanized at 148° C. for 30 minutes to prepare a vulcanized rubber composition. Thereafter, the prepared vulcanized rubber composition was cut into a strip shape (length 20 mm×width 5 mm×thickness 2 mm) and was prepared as a test piece.

For the obtained test piece, tan δ was measured by a viscoelastic spectrometer (manufactured by Toyo Seiki Seisaku-sho, Ltd.). The measurement temperatures were at −40° C. and 20° C. The measurement of tan δ was performed under the condition that the test piece was at 10% strain, and subjected to a vibration at ±2% amplitude and a frequency of 20 Hz.

The results are shown in Table 1 (tan δ (−40° C.), tan δ (20° C.)). The results were indicated by indices: for Comparative Examples 2 to 3 and Working Examples 1 to 2, all the indices were normalized to tan δ of Comparative Example 1 as 100.0; for Working Example 3, the index was normalized to tan δ of Comparative Example 4 as 100.0.

Smaller tan δ indicates superior energy-saving properties.

Evaluation of Tear Resistance

The vulcanized rubber composition was prepared in the same manner as in the evaluation of tan δ. A test piece was cut out into a crescent shape from each vulcanized rubber composition prepared, in accordance with JIS K6252:2001, and a cut with a length of 1.0±0.2 mm was made in a direction perpendicular to the main axis in a central concave part. The test was performed in a condition where the travel velocity of a test piece gripper was at 500 mm/min, and the tear strength (TR) [kN/m] was measured at room temperature.

The results are shown in Table 1 (tear resistance). The results were indicated by indices: for Comparative Examples 2 to 3 and Working Examples 1 to 2, all the indices were normalized to tear strength of Comparative Example 1 as 100.0; for Working Example 3, the index was normalized to tear strength of Comparative Example 4 as 100.0.

Greater tear strength indicates superior tear resistance.

Evaluation of Bending Resistance

According to the flex crack growth test in accordance with JIS K6260:2010, crack generation test was performed by repeated bending.

Specifically, a vulcanized rubber composition was prepared in the same manner as in the evaluation of tan δ as described above, and a test piece of the size and the thickness defined in the flex crack growth test above was prepared. Then, the test was performed using a De Mattia flex test machine for a test piece with a cut made by a designated blade (temperature: room temperature, stroke: 20 mm, number of bending per minute: 300±10). The crack length after 400,000 bendings was recorded.

The results are shown in Table 1 (bending resistance). The results were indicated by indices: for Comparative Examples 2 to 3 and Working Examples 1 to 2, all the indices were normalized to the crack length of Comparative Example 1 as 100.0; for Working Example 3, the index was normalized to the crack length of Comparative Example 4 as 100.0.

Shorter crack length indicates superior bending resistance.

TABLE 1

|  | Comparative Example 1 | Comparative Example 2 | Comparative Example 3 |
|---|---|---|---|
| NR | 40.00 | 40.00 | 40.00 |
| BR | 60.00 |  | 50.00 |
| Terminal-modified BR |  | 60.00 |  |
| Nitrone-modified BR |  |  | 10.00 |
| Carbon black 1 | 37.00 | 37.00 | 37.00 |
| Carbon black 2 |  |  |  |
| Silica |  |  |  |
| Sulfur | 1.50 | 1.50 | 1.50 |
| Vulcanization accelerator | 1.50 | 1.50 | 1.50 |
| tan δ (−40° C.) | 100.0 | 112.9 | 97.1 |
| tan δ (20° C.) | 100.0 | 77.1 | 97.6 |
| Tear resistance | 100.0 | 28.0 | 104.0 |
| Bending resistance | 100.0 | 600.0 | 87.7 |

|  | Working Example 1 | Working Example 2 | Comparative Example 4 | Working Example 3 |
|---|---|---|---|---|
| NR | 40.00 | 40.00 | 70.00 | 70.00 |
| BR | 30.00 |  | 30.00 |  |
| Terminal-modified BR |  |  |  |  |
| Nitrone-modified BR | 30.00 | 60.00 |  | 30.00 |
| Carbon black 1 | 37.00 | 37.00 |  |  |
| Carbon black 2 |  |  | 30.00 | 30.00 |

TABLE 1-continued

| | | | | |
|---|---|---|---|---|
| Silica | | | 10.00 | 10.00 |
| Sulfur | 1.50 | 1.50 | 3.00 | 3.00 |
| Vulcanization accelerator | 1.50 | 1.50 | 1.50 | 1.50 |
| tan δ (−40° C.) | 91.1 | 87.9 | 100.0 | 88.0 |
| tan δ (20° C.) | 92.6 | 89.0 | 100.0 | 94.4 |
| Tear resistance | 112.1 | 120.8 | 100.0 | 102.1 |
| Bending resistance | 70.0 | 10.0 | 100.0 | 86.5 |

The details of each component shown in Table 1 above are as follows.

NR: Natural rubber; RSS #3
BR: Butadiene rubber: Nippol BR 1220 (manufactured by the Zeon Corporation)
Terminal-modified BR: Terminal-modified butadiene rubber, Nipol BR 1250H (manufactured by Zeon Corporation)
Nitrone-modified BR: Nitrone-modified butadiene rubber synthesized as described above
Carbon black 1: HAF-grade carbon black, Show Black N339 (nitrogen adsorption specific surface area=90 $m^2$/g, manufactured by Cabot Japan)
Carbon black 2: GPF-grade carbon black, Diablack G (nitrogen adsorption specific surface area=29 $m^2$/g, manufactured by Mitsubishi Chemical Corporation)
Silica: Precipitated silica, Nipsil AQ (manufactured by Tosoh Silica Corporation)
Sulfur: Oil-treated sulfur (manufactured by Hosoi Chemical Industry Co., Ltd.)
Vulcanization accelerator: N-tert-butyl-2-benzothiazolyl sulfenamide, NOCCELER NS-P (manufactured by Ouchi Shinko Chemical Industrial Co., Ltd.)

As can be seen from Table 1, all of the working examples of the present application, which contained the nitrone-modified butadiene rubber, exhibited superior energy-saving properties, tear resistance and bending resistance, compared to Comparative Examples 1, 2 and 4, which do not contain the nitrone-modified butadiene rubber.

Comparison between Working Examples 1 and 2 showed that Working Example 2 which contained the nitrone-modified butadiene rubber at 40 mass % or greater in the diene rubber exhibited superior energy-saving properties, tear resistance and bending resistance.

Comparative Example 3, which contained the nitrone-modified butadiene rubber but the content of the nitrone-modified butadiene rubber in the diene rubber was less than 15 mass %, exhibited insufficient energy-saving properties.

The invention claimed is:

1. A rubber composition for a conveyor belt comprising: a diene rubber and a carbon black,
   the diene rubber containing:
   a natural rubber; and
   a modified butadiene rubber obtained by modifying a butadiene rubber with a nitrone compound;
   a content of the natural rubber in the diene rubber being 30 to 85 mass %, and a content of the modified butadiene rubber in the diene rubber being 15 to 70 mass %.

2. The rubber composition for a conveyor belt according to claim 1, wherein the nitrone compound contains a carboxy group.

3. The rubber composition for a conveyor belt according to claim 1, wherein a content of the carbon black is from 20 to 50 parts by mass per 100 parts by mass of the diene rubber.

4. The rubber composition for a conveyor belt according to claim 1, wherein a nitrogen adsorption specific surface area of the carbon black is from 25 to 100 $m^2$/g.

5. The rubber composition for a conveyor belt according to claim 1, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

6. The rubber composition for a conveyor belt according to claim 1, wherein a degree of modification of the modified butadiene rubber is from 0.02 to 4.0 mol %, where "degree of modification" refers to a proportion (mol %) of double bonds modified with the nitrone compound to all the double bonds contained in the butadiene rubber.

7. A conveyor belt comprising the rubber composition for a conveyor belt described in claim 1 as a lower cover rubber layer.

8. The rubber composition for a conveyor belt according to claim 2, wherein a content of the carbon black is from 20 to 50 parts by mass per 100 parts by mass of the diene rubber.

9. The rubber composition for a conveyor belt according to claim 2, wherein a nitrogen adsorption specific surface area of the carbon black is from 25 to 100 $m^2$/g.

10. The rubber composition for a conveyor belt according to claim 3, wherein a nitrogen adsorption specific surface area of the carbon black is from 25 to 100 $m^2$/g.

11. The rubber composition for a conveyor belt according to claim 8, wherein a nitrogen adsorption specific surface area of the carbon black is from 25 to 100 $m^2$/g.

12. The rubber composition for a conveyor belt according to claim 2, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

13. The rubber composition for a conveyor belt according to claim 3, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

14. The rubber composition for a conveyor belt according to claim 4, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

15. The rubber composition for a conveyor belt according to claim 8, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

16. The rubber composition for a conveyor belt according to claim 9, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

17. The rubber composition for a conveyor belt according to claim 10, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

18. The rubber composition for a conveyor belt according to claim 11, wherein the nitrone compound is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

19. The rubber composition for a conveyor belt according to claim 2, wherein a degree of modification of the modified butadiene rubber is from 0.02 to 4.0 mol %, where "degree of modification" refers to a proportion (mol %) of double bonds modified with the nitrone compound to all the double bonds contained in the butadiene rubber.

20. The rubber composition for a conveyor belt according to claim 3, wherein a degree of modification of the modified butadiene rubber is from 0.02 to 4.0 mol %, where "degree of modification" refers to a proportion (mol %) of double bonds modified with the nitrone compound to all the double bonds contained in the butadiene rubber.

* * * * *